United States Patent [19]
Brown

[11] Patent Number: 5,574,622
[45] Date of Patent: Nov. 12, 1996

[54] POWER TRUCK

[76] Inventor: Julius Brown, 11405 Azalea Dr., Pittsburgh, Pa. 15235

[21] Appl. No.: 447,086

[22] Filed: May 22, 1995

[51] Int. Cl.⁶ .................................................. H02B 1/26
[52] U.S. Cl. ........................ 361/625; 307/150; 439/577
[58] Field of Search ................................. 439/527, 529, 439/577; 361/601, 602, 622, 625; 307/150

[56] References Cited

U.S. PATENT DOCUMENTS

| | | | |
|---|---|---|---|
| 3,154,358 | 10/1964 | Blasch | 361/625 |
| 3,631,324 | 12/1971 | Jones | 361/625 |
| 4,956,745 | 9/1990 | Burgher et al. | 307/150 |

*Primary Examiner*—Gary F. Paumen
*Attorney, Agent, or Firm*—Susan E. Nagel

[57] ABSTRACT

The invention involves a portable and mobile power distribution device which can provide 12,000 watts of power and needs only a 220 volt source. The invention specifically involves a two wheel support stand comprising a 12,000 watt distribution panel situated atop an outlet box containing 110 volt AC 3-prong grounded duplex outlets, with a male turnlok connector socket for a 220 volt, 100 amp power cable with a female plug mounted in the center of the distribution panel.

4 Claims, 5 Drawing Sheets

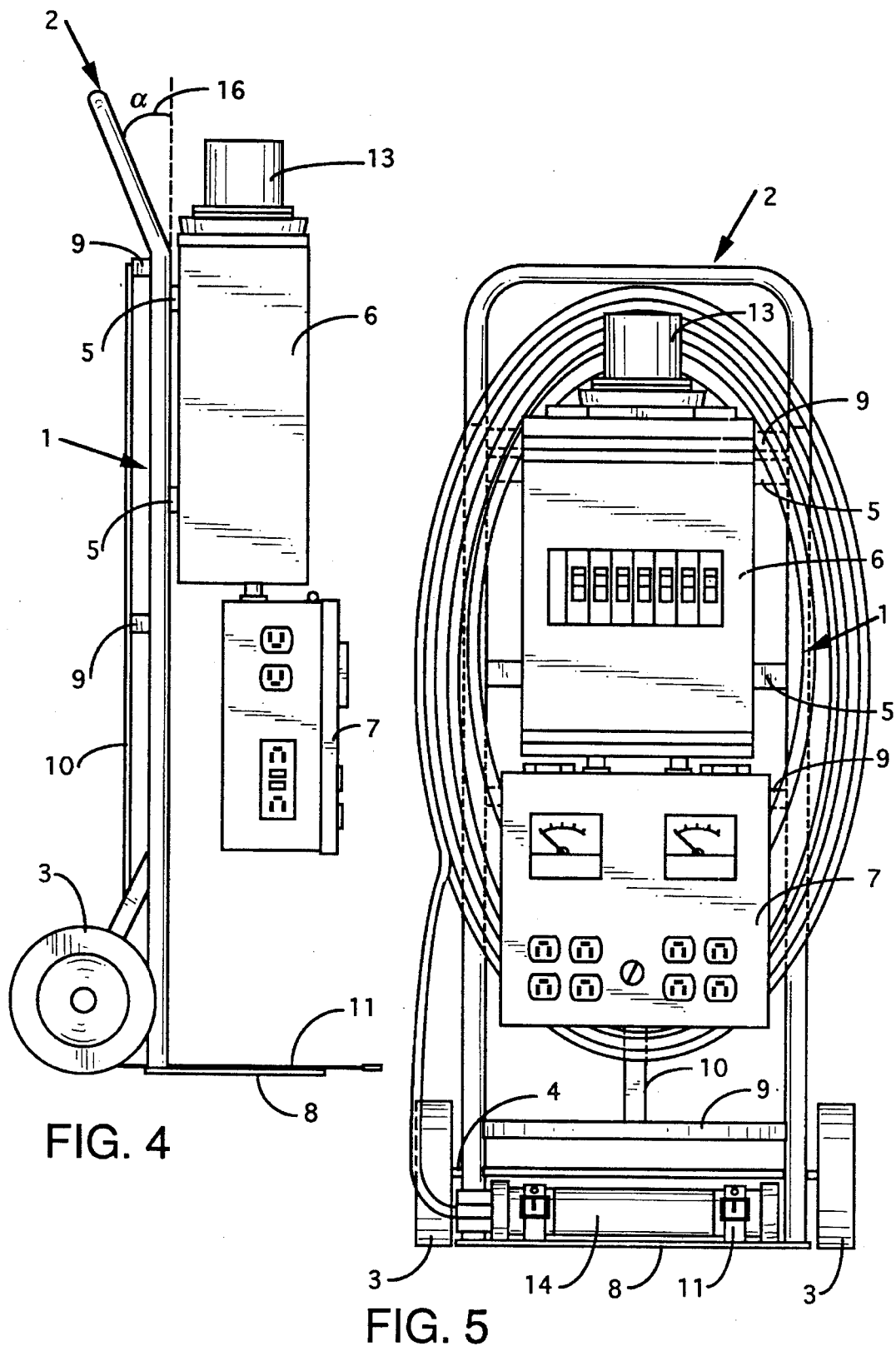

POWER TRUCK

II. BACKGROUND OF THE INVENTION

1. Field of the Invention

The field of invention relates to power distribution devices, and in particular to portable electrical distribution panels.

2. Description of the Related Art

The prior art consists of portable power distribution devices, but without the mobility of the present invention.

III. SUMMARY OF THE INVENTION

The invention involves a portable and mobile power distribution device which can provide 12,000 watts of power and needs only a 220 volt source. The invention specifically involves a two wheel support stand comprising a 12,000 watt distribution panel situated atop an outlet box containing 110 volt AC 3-prong grounded duplex outlets, with a male turnlok connector socket for a 220 volt, 100 amp power cable with a female plug mounted in the center of the distribution panel. The invention is advantageous over the prior art for several reasons. First, the invention provides a large source of power while needing only a 220 volt source. Second, the invention can be easily maneuvered and set up in minutes. Other power distribution systems are large and immobile, must be custom made, and are not usually accessible to the common person. The panel may be used, but is not limited to, as a source of power for bands, concerts, and festivals; for vendors for refrigeration systems, deep fryers, heating elements, drink dispensers and lights; for construction companies for electrical equipment, trailers, communication systems, heaters and lights, decorations, and advertisement displays; for campgrounds for appliances, stores, microwave ovens and entertainment systems and lights; for picnics for cooking; for emergencies; and for the military for communication equipment, computers, radar, battery chargers, and hospital equipment and lights.

IV. BRIEF DESCRIPTION OF THE DRAWINGS

FIG. 4 is a side view of the power truck.

FIG. 5 is a frontal view of the power truck with an illustration of how cable may be stored thereon.

V. DESCRIPTION OF THE PREFERRED EMBODIMENT

Figure 1:
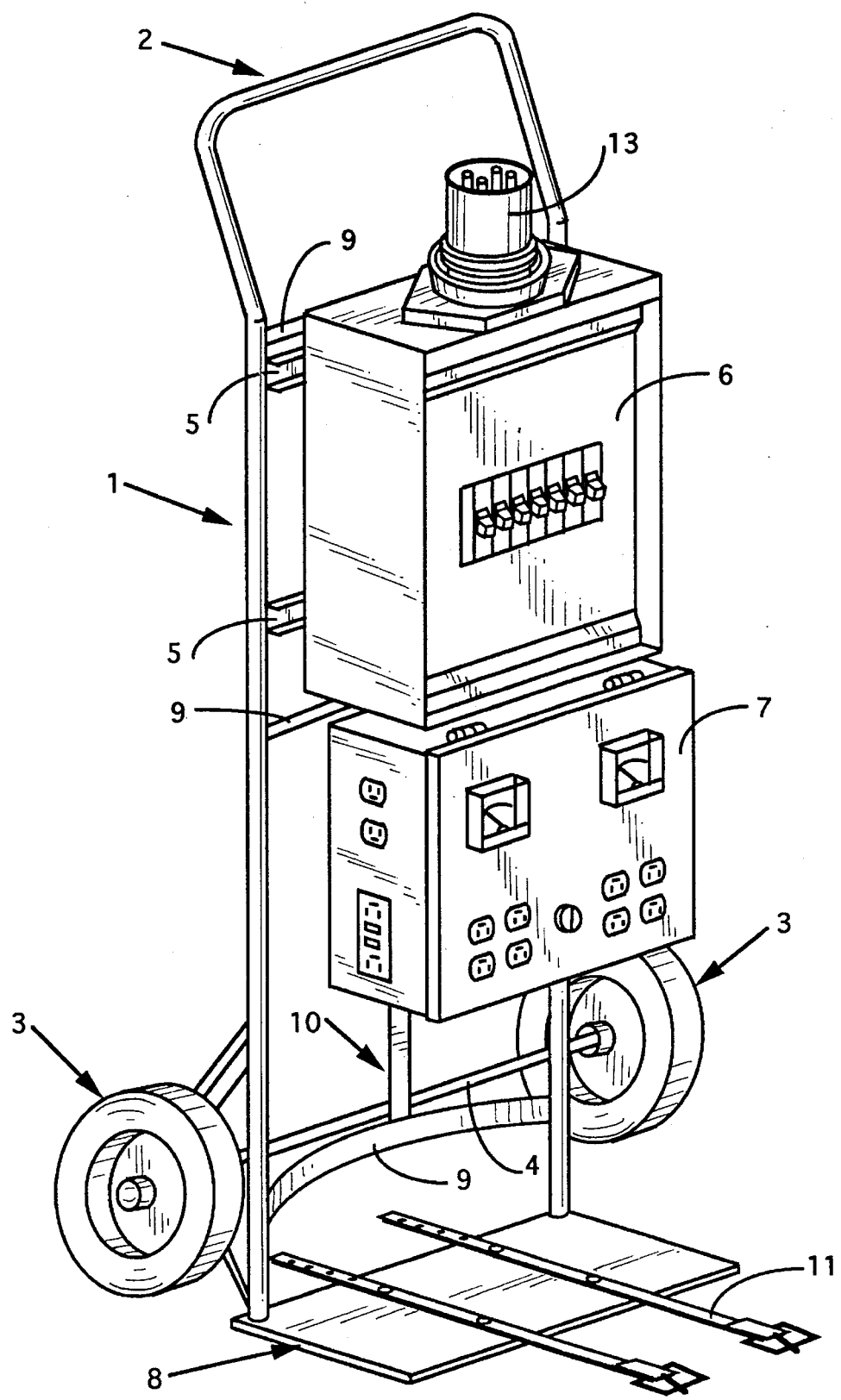
FIG. 1 is a perspective view from the front and right side of the power truck.
Figure 2:
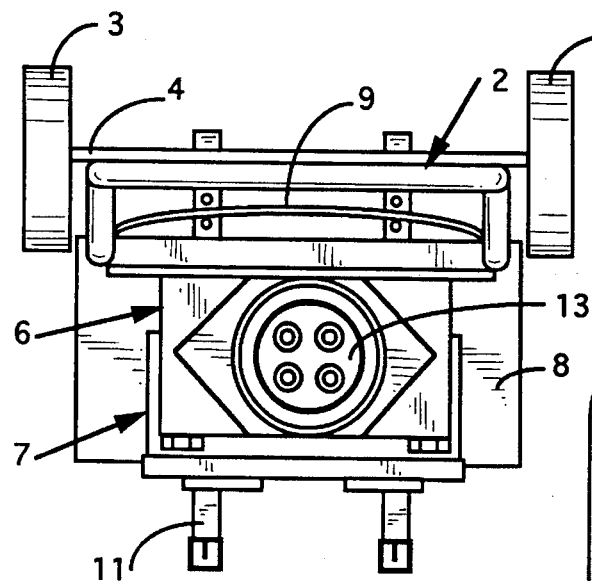
FIG. 2 is a top view of the power truck.
Figure 3:
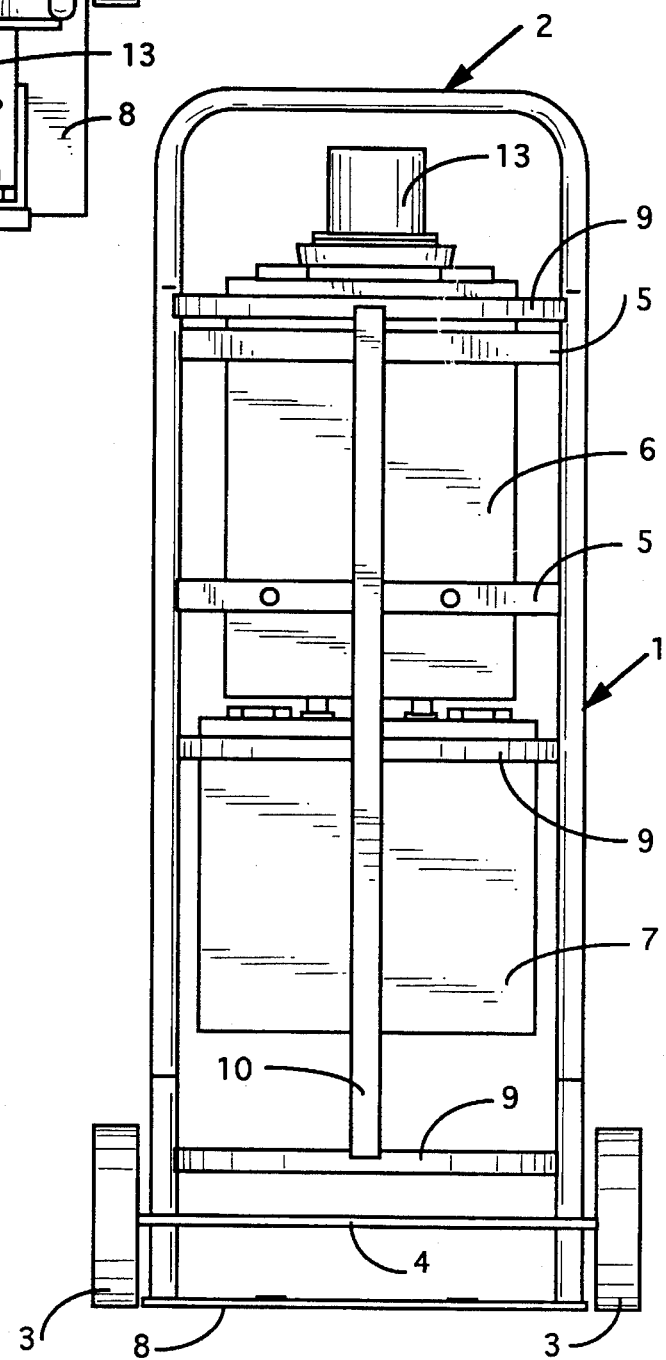
FIG. 3 is a back view of the power truck.

As may best be seen in FIG. 1, the invention comprises a two wheel support stand (1) consisting of an inverted U-shaped frame (2) which bends away at its uppermost portion such that it has an angle ($\alpha$)(16) with the vertical which may best be viewed in FIG. 4, the angle ($\alpha$) measuring to be 45 degrees, with a wheel (3) attached to either side of the frame (2), the two wheels themselves connected via a rod (4), and a flat base (8) connecting the bottom of the two sides of the frame (2) upon which to allow the support stand (1) to rest in an upright position. The interior space created by the frame (2) is bisected by two cross-bars (5) connecting the sides of the frame (2) and supporting a distribution panel (6) situated atop an outlet box (7). The distribution panel (6) which is secured by the two cross-bars (5) can provide 12,000 watts of power and is, in turn connected to a outlet box (7) containing at least 4 pairs of 110 volt AC 3-prong grounded duplex outlets. In the center of the distribution panel (6) is a male turnlok connector socket (13) which can best be visualized in FIG. 2 for a 220 volt, 100 amp power cable with a female plug (14) including a female turnlok connector (15). The support stand (1) has additionally an external support frame which can be best viewed in FIG. 3 comprising at least three horizontal bowed bars (9) connecting each side of the frame (2), and a longitudinal bar (10) connecting each of the three horizontal bars (9) at the midpoint. The flat base also has fastening devices (11) which allow the female plug (14) to be stored securely when the invention is mobilized, as best can be visualized in FIG. 5.

Figure 6:
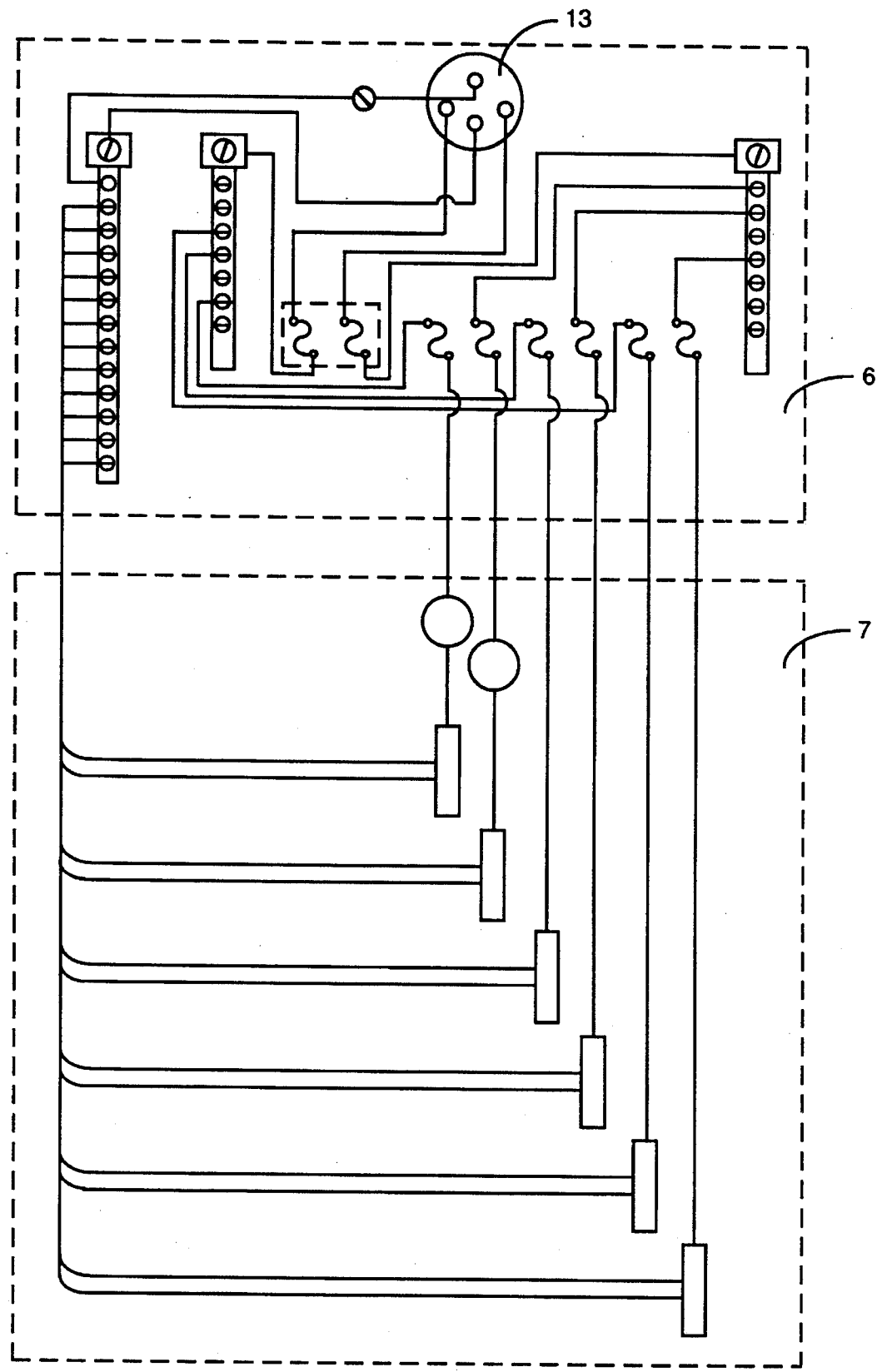
FIG. 6 is a view of the circuitry in the distribution and outlet boxes.
Figure 7:
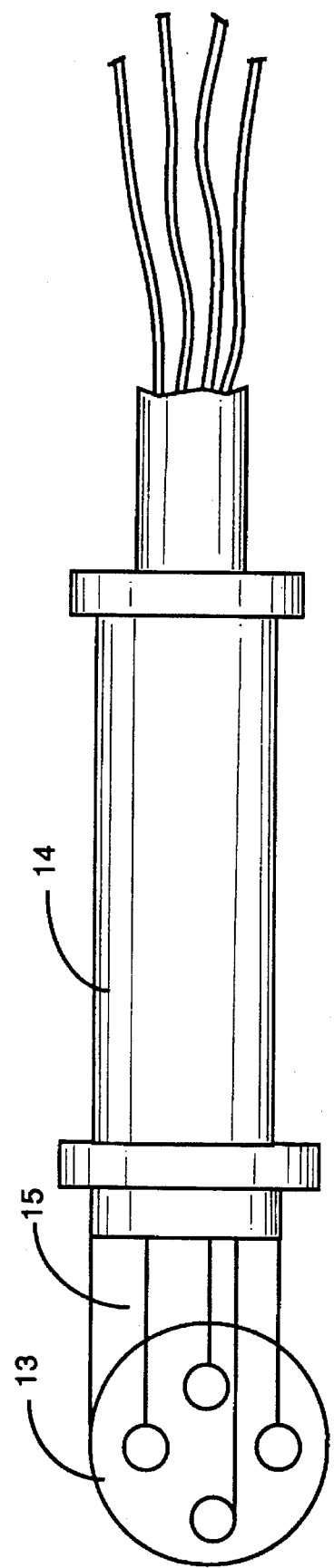
FIG. 7 is a view of the connection between the male and female plugs.

FIG. 6 shows the circuitry between the distribution panel and the outlet box, which is well known in the prior art, and FIG. 7 is a view of the connection between the male turnlok connector socket (13) and the female turnlok connector (15) aspect of the female plug (14).

The power truck may be utilized in the following manner: the power truck is connected via its male turnlok connector socket to a 220 volt source. The user may then access the 110 volt outlet as a source of power. The power truck may be easily set up and moved as needed. The female plug of any cable may be stored on the flat base (8) with the fastening devices (11) secured around the female turnlok connector with the rest of the cable wrapped around the invention as can best be visualized in FIG. 5.

I claim:

1. I claim, a portable power distribution device, which comprises:

a support stand (1) having an inverted U-shaped frame (2) defining an interior space with a flat base (8) defining a final side of said interior space, said interior space bisected by cross-bars (5) to connect each side of said frame (2), and a wheel (3) attached to each side of said frame (2), said wheels (3) connected via a rod (4), an external support frame;

a distribution panel (6) attached to said cross bars (5) containing a male turnlok connector socket (13) mounted centrally atop said distribution panel (6);

and an outlet box (7) containing three prong grounded duplex outlets.

2. I claim, an external support frame as in claim 1 which comprises:

horizontal bowed bars (9) connecting each side of said frame (2), and; a longitudinal bar (10) connecting the midpoint of each of said bars.

3. I claim, an inverted U-shaped frame (2) as in claim 1 which has at its uppermost portion a bend away from said distribution panel (6) at an angle ($\alpha$)(16) with the vertical.

4. I claim, a flat base (8) as in claim 1 comprising at least two fastening devices (11) for securing a female plug (14) at an end of a cable.

* * * * *